March 26, 1929.　　　G. A. BOYDEN　　　1,707,046

SEMISQUARE RAILROAD CAR TRUCK

Filed Nov. 7, 1925

INVENTOR.

George A. Boyden

Patented Mar. 26, 1929.

1,707,046

UNITED STATES PATENT OFFICE.

GEORGE A. BOYDEN, OF BALTIMORE, MARYLAND, ASSIGNOR TO BOYDEN RAILROAD CAR TRUCK CORPORATION, A CORPORATION OF DELAWARE.

SEMISQUARE RAILROAD-CAR TRUCK.

Application filed November 7, 1925. Serial No. 67,679.

This invention pertains to semi-square four wheel railroad car trucks and method of operation thereof. Among the objects are to prevent square trucks from becoming out of square or loose and rickety, and also overcome the abnormal wear between the wheel flanges and the curved rails.

Figure 1:
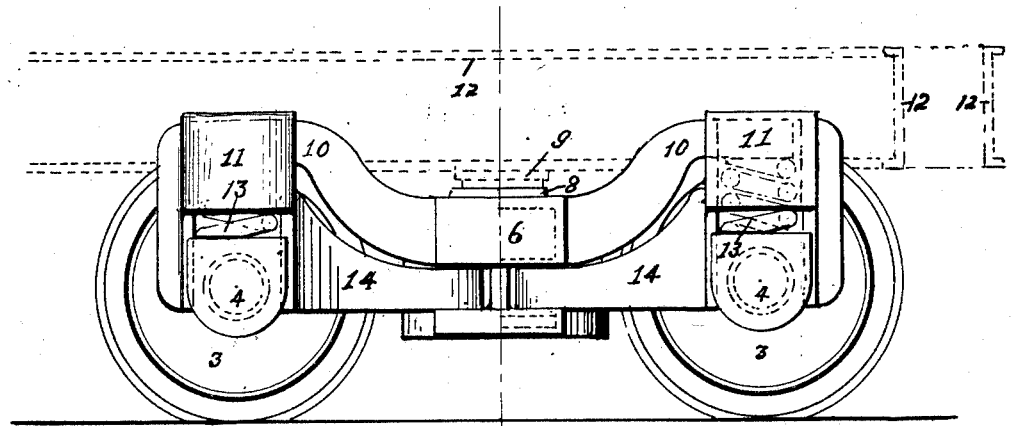
Figure 2:
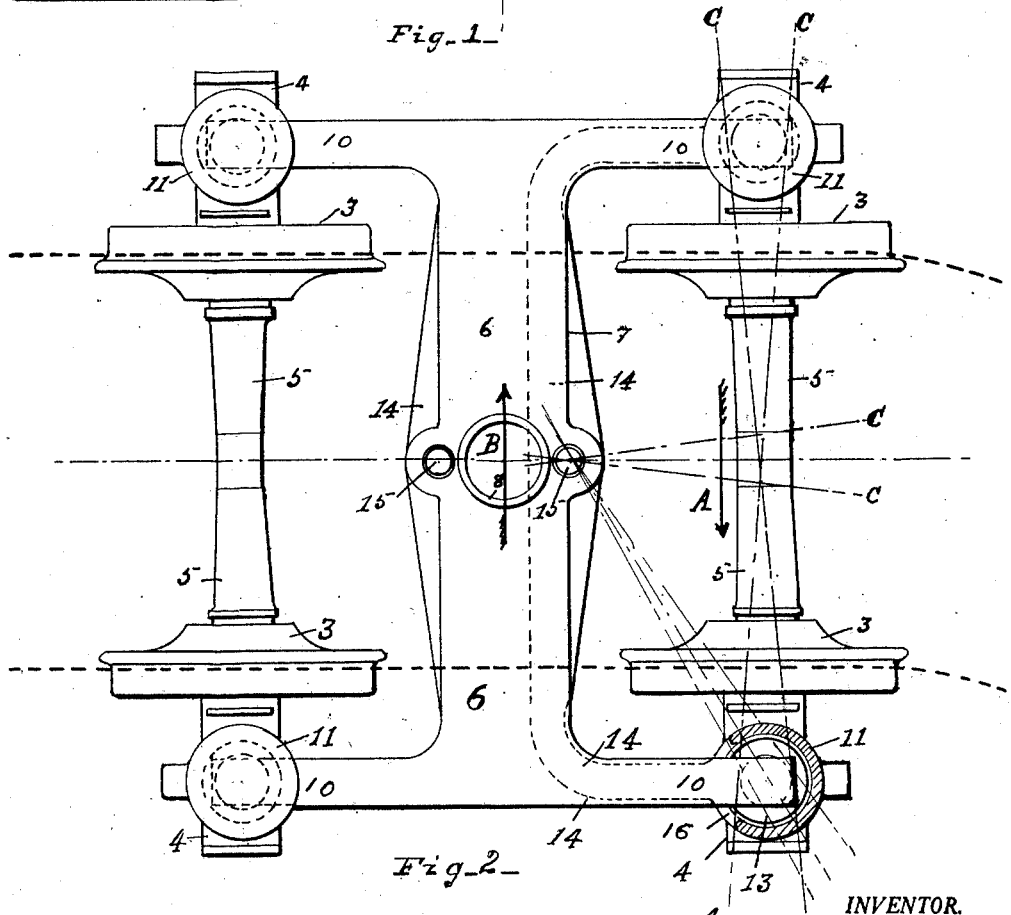

In the drawings, which are for illustrated purposes only and in no way to limit the invention or scope of the claims, Fig. 1 is the side view of the truck, Fig. 2 a top view partly in section, of Fig. 1. Throughout the several views like numerals refer to like parts.

The numerals 3, 4, 5, represent the wheels, journal boxes and axles respectively, which are of the ordinary form and operate in the usual manner.

The frame 6 consists of the truck bolster 7 provided with the center plate 8, on which rests the car bolster 9 in the usual manner. From the truck bolster 7 extends four arms 10 that enter slots 16 in the spring housings 11 and therein rest on top of the springs 13, or intervening plates placed between the springs and arms, if desirable. By this structure of the frame 6 the weight of one end of the car body through the car sills 12 is carried to the four journal boxes 4 and likewise distributed to the four journals of the axles 5, through the springs 13. The journal boxes 4 are slidable vertically in the members or yokes 14 below the housings 11 and move with the members or yokes about the pivots 15, although said members and boxes may have relative vertical movement.

Beneath the H-shaped frame 6 are arranged the journal members or yokes 14 shown partially in dotted lines Fig. 2. Cast integral with each end of the journal members 7 are the spring housings 11 provided with slots 16 through which enter the arms 10 of the frame 6. The arms 10, resting on the springs 13, and the slots 16 being a little wider than said arms allow the journal members 14 to move slightly to either side in reference to the frame 6 and in so doing the journals assume an angular position to the frame (see dotted lines C) and radial position to the curve of the track on entering the curve.

This movement accomplishes two functions; first, it relieves the frame 6 of the sudden shock on entering the curve or tangent track, and second, places the journal radial to the track curvature. The effects of this movement is to provide a truck frame that will not bend or get out of square; to relieve the truck parts generally, especially the journal bearings from wearing abnormally, for every time the trucks, as now constructed, enter the curve or tangent there is a binding of the journals against one side of the brasses; and reduce the wear on the wheel flange and rail to a minimum.

The slots 16 in the spring housing 11 are constructed of sufficient width to prevent no greater movement of the frame in relation to the axle than is necessary to accomplish the desired results.

In the operation when the truck passes from the tangent to the curve or vice versa the flange of the outer forward wheel is forced or moved toward the radial point of the track curve (see arrow A). At the same time, or simultaneous therewith, the direction of the car sills 12 tends to carry the truck frame 6 outward or from the radial point of the curve (see arrow B). The joint acts of the outward movement of the car sills and the inward movement of the wheel flange and journal both contribute to overcome the friction between the arms 10 and the top of the springs 13 and thereby assures the axle 5 to assume the radial position and relieves the truck frame of the sudden and undue strain.

Having described my invention what I claim and desire to secure by United States Letters Patent is:—

1. A railroad car truck including a frame, a yoke pivoted to the frame, journal boxes movable with and yieldable vertically relatively to said yoke, and an axle journaled in said boxes, the frame extending over and being supported on said boxes with relatively movable contact portions between said frame and boxes.

2. A railroad car truck including a frame, a pair of axles, yokes pivoted to the frame between said axles, and journal boxes for the axles movable with and yieldable vertically relatively to said yokes, the frame having portions extending over and being supported on said boxes with relatively movable contact portions between said frame and boxes.

3. A railroad car truck including a frame having a bolster and arms extending therefrom, a yoke pivoted to said bolster, journal boxes movable with said yoke, and an axle journaled in said boxes, said arms extending over and being supported on said boxes with relatively movable contacting portions between them.

4. A railroad car truck including a frame having a bolster and arms extending therefrom, a pair of axles, yokes pivoted to said bolster, and journal boxes movable with said yokes and in which said axles are journaled, said arms extending over and being supported on said boxes with relatively movable contacting portions between said arms and boxes.

5. A railroad car truck including a frame, a yoke pivoted to the frame, journal boxes slidable vertically in the yoke, an axle journaled in said boxes, and spring means yieldingly supporting the frame on said boxes.

6. A railroad car truck including a frame, two axles, yokes pivoted to the frame between said axles, journal boxes for said axles slidable vertically in said yokes, and spring means yieldingly supporting said frame on said boxes.

7. A railroad car truck including a frame, a yoke pivoted to the frame, journal boxes slidable vertically in the yoke, an axle journaled in said boxes, and spring means associated with said frame, yoke and boxes to yieldingly support the frame.

8. A railroad car truck including a frame, two axles, yokes pivoted to the frames between said axles, journal boxes for said axles slidable vertically in said yokes, and spring means associated with said frame, yokes and boxes for yieldingly supporting the frame.

9. A railroad car truck including a frame, a yoke pivoted to the frame, journaled boxes movable with and yieldable vertically relatively to the yoke, an axle journaled in said boxes, said frame having portions extending over said boxes, and spring means confined between said portions and boxes.

10. A railroad car truck including a frame, two axles, yokes pivoted to the frame between said axles, journal boxes for said axles movable with the yokes, the frame having portions extending above said boxes, and spring means confined between said portions and boxes.

11. A railroad car truck including a frame, a yoke pivoted to the frame, journal boxes slidable vertically in said yoke, an axle journaled in said boxes, the frame having portions extending above said boxes, and spring means confined between said portions and boxes.

12. A railroad car truck including a frame, two axles, yokes pivoted to the frame between said axles, journal boxes for said axles slidable vertically in the yokes, the frame having portions extending above said boxes, and spring means confined between said portions and boxes.

13. A railroad car truck including a frame, a yoke pivoted to the frame and having spring housings provided with slots, journaled boxes, an axle journaled in said boxes, the frame having arms extending through said slots into said housings, and spring means between said arms and boxes.

14. A railroad car truck including a frame, two axles, yokes pivoted to the frame between said axles and having spring housings provided with slots, journal boxes for said axles, the frame having arms extending through said slots into said housings, and spring means between said arms and boxes.

15. A railroad car truck including a frame, a yoke pivoted to the frame and having spring housings provided with slots, journal boxes slidable vertically in the yoke, an axle journaled in said boxes, the frame having arms projecting through said slots into said housings, and spring means confined between said arms and boxes.

16. A railroad car truck including a frame, two axles, yokes pivoted to the frame between said axles and having spring housings provided with slots, journal boxes for said axles slidable vertically in said yokes below said housings, the frame having arms projecting through said slots into said housings, and spring means confined between said arms and boxes.

In testimony whereof I affix my signature.

GEORGE A. BOYDEN.